United States Patent
Nickel

(10) Patent No.: US 12,059,008 B2
(45) Date of Patent: Aug. 13, 2024

(54) CAPSULE CONTAINING BEVERAGE POWDER, IN PARTICULAR FOR PREPARING BREWED COFFEE

(71) Applicant: SWISS COFFEE INNOVATION AG, Olten (CH)

(72) Inventor: Axel Nickel, Hemmingen (DE)

(73) Assignee: Swiss Coffee Innovation AG, Olten (CH)

( * ) Notice: Subject to any disclaimer, the term of this patent is extended or adjusted under 35 U.S.C. 154(b) by 149 days.

(21) Appl. No.: 15/742,438

(22) PCT Filed: Jul. 7, 2016

(86) PCT No.: PCT/EP2016/066197
§ 371 (c)(1),
(2) Date: Jan. 5, 2018

(87) PCT Pub. No.: WO2017/005877
PCT Pub. Date: Jan. 12, 2017

(65) Prior Publication Data
US 2018/0206515 A1 Jul. 26, 2018

(30) Foreign Application Priority Data
Jul. 7, 2015 (EP) .................................. 15175704

(51) Int. Cl.
| | | |
|---|---|---|
| *C09D 105/00* | (2006.01) | |
| *A23F 3/32* | (2006.01) | |
| *A23F 5/38* | (2006.01) | |
| *A23G 1/40* | (2006.01) | |
| *A23G 1/46* | (2006.01) | |
| *A23G 1/56* | (2006.01) | |
| *A23P 10/30* | (2016.01) | |
| *B65D 85/804* | (2006.01) | |
| *C08B 15/10* | (2006.01) | |
| *C08B 31/00* | (2006.01) | |
| *C08B 37/00* | (2006.01) | |
| *C09D 101/02* | (2006.01) | |
| *C09D 103/04* | (2006.01) | |
| *C09D 105/04* | (2006.01) | |
| *C09D 105/08* | (2006.01) | |
| *C09D 105/12* | (2006.01) | |

(52) U.S. Cl.
CPC ............... *A23F 5/385* (2013.01); *A23F 3/32* (2013.01); *A23P 10/30* (2016.08); *B65D 85/8043* (2013.01); *C08B 15/10* (2013.01); *C08B 31/003* (2013.01); *C08B 37/0039* (2013.01); *C08B 37/0042* (2013.01); *C08B 37/0084* (2013.01); *C09D 101/02* (2013.01); *C09D 103/04* (2013.01); *C09D 105/00* (2013.01); *C09D 105/04* (2013.01); *C09D 105/08* (2013.01); *C09D 105/12* (2013.01); *A23G 1/40* (2013.01); *A23G 1/46* (2013.01); *A23G 1/56* (2013.01)

(58) Field of Classification Search
CPC ............ A23F 3/32; A23F 5/385; A23P 10/30
See application file for complete search history.

(56) References Cited

U.S. PATENT DOCUMENTS

| | | | |
|---|---|---|---|
| 2,931,727 A | 4/1960 | Kraut | |
| 2,931,728 A | 4/1960 | Franck et al. | |
| 3,218,183 A | 11/1965 | Fritzsching et al. | |
| 3,293,041 A | 12/1966 | Name | |
| 3,511,666 A | 5/1970 | Hudson et al. | |
| 3,640,727 A | 2/1972 | Heusinkvel | |
| 3,865,962 A * | 2/1975 | Earle | A23L 19/05 426/291 |
| 3,930,086 A | 12/1975 | Harmon | |
| 4,520,033 A | 5/1985 | Tout | |
| 4,724,620 A | 2/1988 | Hsu | |
| 4,975,295 A * | 12/1990 | Sierra | A23F 5/385 426/285 |
| 5,506,011 A | 4/1996 | Farrell et al. | |
| 5,688,776 A * | 11/1997 | Bauer | A61K 9/1652 514/54 |
| 5,882,715 A | 3/1999 | Nielsen et al. | |
| 7,967,904 B2 | 6/2011 | Bowden et al. | |
| 2003/0008059 A1 | 1/2003 | Macinnes et al. | |

(Continued)

FOREIGN PATENT DOCUMENTS

| | | | | |
|---|---|---|---|---|
| DE | 10 2014 000 187 A1 | 7/2015 | | |
| EP | 0615691 A1 * | 9/1994 | ............... | C08L 5/04 |

(Continued)

OTHER PUBLICATIONS

Sipahi, "Improved multilayered antimicrobial alginate-based edible coating extends the shelf life of fresh-cut watermelon (Citrullus lanatus)", Food Science and Technology, 2013, 51, pp. 9-15 (Year: 2013).*

(Continued)

*Primary Examiner* — Changqing Li
(74) *Attorney, Agent, or Firm* — Finch & Maloney PLLC

(57) ABSTRACT

A capsule for preparing a beverage from beverage powder, such as coffee from coffee powder, by introducing water into the capsule. The capsule includes a compacted pellet made of a powder containing at least one polysaccharide. The compacted pellet is sheathed with at least one coating layer that includes a cross-linked polysaccharide. The cross-linked polysaccharide can be obtained by cross-linking a polysaccharide with a cross-linking agent without the use of a polyol spacer. Also disclosed are methods for manufacturing such a capsule.

10 Claims, No Drawings

(56) References Cited

U.S. PATENT DOCUMENTS

| | | |
|---|---|---|
| 2004/0052910 A1 | 3/2004 | Nakamura et al. |
| 2004/0213930 A1 | 10/2004 | Halabisky |
| 2005/0008660 A1* | 1/2005 | Kipke .............. A61L 24/08 |
| | | 424/400 |
| 2005/0158426 A1 | 7/2005 | Hu et al. |
| 2005/0163904 A1 | 7/2005 | Walker et al. |
| 2005/0183581 A1 | 8/2005 | Kirschner et al. |
| 2005/0220946 A1 | 10/2005 | Torcatis |
| 2007/0009715 A1 | 1/2007 | Santarella et al. |
| 2008/0156857 A1 | 7/2008 | Johnston |
| 2008/0213406 A1 | 9/2008 | Stock et al. |
| 2008/0299264 A1 | 12/2008 | Torcatis |
| 2008/0317931 A1 | 12/2008 | Mandralis et al. |
| 2009/0220717 A1 | 9/2009 | Wilczak et al. |
| 2009/0232954 A1 | 9/2009 | Imison |
| 2010/0288131 A1 | 11/2010 | Kilber et al. |
| 2010/0297320 A1 | 11/2010 | Branlard et al. |
| 2010/0323083 A1* | 12/2010 | Rubinstenn ............. A23F 3/32 |
| | | 426/594 |
| 2011/0195171 A1 | 8/2011 | Tieman |
| 2011/0200715 A1 | 8/2011 | Fuisz et al. |
| 2011/0269779 A1* | 11/2011 | Wilson .............. A61P 27/02 |
| | | 514/262.1 |
| 2011/0293811 A1 | 12/2011 | Linqiu et al. |
| 2012/0015094 A1 | 1/2012 | Young |
| 2012/0021115 A1 | 1/2012 | Boehm et al. |
| 2012/0058226 A1 | 3/2012 | Winkler et al. |
| 2012/0128802 A1 | 5/2012 | Manabe et al. |
| 2012/0301592 A1 | 11/2012 | Scholz et al. |
| 2013/0071516 A1 | 3/2013 | Elejalde et al. |
| 2013/0071522 A1 | 3/2013 | Mistry et al. |
| 2013/0142915 A1 | 6/2013 | Massey et al. |
| 2013/0177672 A1* | 7/2013 | Robinson .............. A23L 2/52 |
| | | 426/72 |
| 2013/0202748 A1 | 8/2013 | Fountain et al. |
| 2013/0294711 A1 | 11/2013 | Stanley et al. |
| 2014/0113152 A1 | 4/2014 | Zischka et al. |
| 2014/0147563 A1 | 5/2014 | Witteveen |
| 2014/0171521 A1 | 6/2014 | Enatsu et al. |
| 2014/0234517 A1 | 8/2014 | Lian Hwee Peng et al. |
| 2014/0272283 A1 | 9/2014 | Swenson |
| 2014/0287127 A1 | 9/2014 | Kang et al. |
| 2014/0370181 A1 | 12/2014 | Young et al. |
| 2015/0056255 A1 | 2/2015 | Ragot et al. |
| 2015/0104546 A1 | 4/2015 | Mintus et al. |
| 2015/0118380 A1 | 4/2015 | Doleyres et al. |
| 2015/0314952 A1 | 11/2015 | Empl et al. |
| 2015/0320254 A1 | 11/2015 | Perentes et al. |
| 2016/0001968 A1 | 1/2016 | Krüger et al. |
| 2016/0007627 A1 | 1/2016 | Breha, III |
| 2016/0017166 A1 | 1/2016 | Zischka et al. |
| 2016/0058027 A1 | 3/2016 | He |
| 2016/0060023 A1 | 3/2016 | Empl et al. |
| 2016/0107831 A1 | 4/2016 | Talon et al. |
| 2016/0122122 A1 | 5/2016 | Empl et al. |
| 2016/0192689 A1 | 7/2016 | Horn |
| 2016/0243177 A1 | 8/2016 | Franklin et al. |
| 2016/0251149 A1 | 9/2016 | Gerbaulet et al. |
| 2016/0270586 A1 | 9/2016 | Corey |
| 2016/0295876 A1 | 10/2016 | Smith |
| 2016/0324202 A1 | 11/2016 | Griego |
| 2017/0008694 A1 | 1/2017 | Andreae et al. |
| 2017/0042374 A1 | 2/2017 | Young |
| 2017/0079465 A1 | 3/2017 | Nichols |
| 2017/0107034 A1 | 4/2017 | Okamoto et al. |
| 2017/0152102 A1 | 6/2017 | van Beek |
| 2017/0158422 A1 | 6/2017 | Andreae et al. |
| 2017/0196249 A1 | 7/2017 | Black et al. |
| 2017/0202236 A1 | 7/2017 | Pedersen et al. |
| 2017/0210554 A1 | 7/2017 | Black et al. |
| 2017/0231247 A1 | 8/2017 | Breha, III |
| 2017/0298308 A1 | 10/2017 | Labeque et al. |
| 2017/0332655 A1 | 11/2017 | Okamura et al. |
| 2017/0334623 A1 | 11/2017 | Gualandi et al. |
| 2017/0355938 A1 | 12/2017 | Lee et al. |
| 2018/0094327 A1 | 4/2018 | Penet et al. |
| 2018/0117161 A1 | 5/2018 | Docherty et al. |
| 2018/0118906 A1 | 5/2018 | Lee et al. |
| 2018/0134878 A1 | 5/2018 | Suzuki et al. |
| 2018/0206515 A1 | 7/2018 | Nickel |
| 2018/0369155 A1 | 12/2018 | Smoukov et al. |
| 2019/0016528 A1 | 1/2019 | Kuhl et al. |
| 2019/0077571 A1 | 3/2019 | Monforton et al. |
| 2019/0085170 A1 | 3/2019 | O'Brien et al. |
| 2019/0119036 A1 | 4/2019 | Nordqvist et al. |
| 2019/0144199 A1 | 5/2019 | Nickel |
| 2019/0225412 A1 | 7/2019 | Cabilli et al. |
| 2019/0373942 A1 | 12/2019 | Higuchi et al. |
| 2021/0129177 A1 | 5/2021 | Nishiyama et al. |

FOREIGN PATENT DOCUMENTS

| | | | |
|---|---|---|---|
| EP | 1 327 663 A1 | 7/2003 | |
| EP | 1524907 A2 | 4/2005 | |
| EP | 3 059 066 A1 | 8/2016 | |
| EP | 3 115 316 A1 | 1/2017 | |
| EP | 3 225 566 A1 | 10/2017 | |
| GB | 762700 A | 12/1956 | |
| JP | 2010-518844 A | 6/2010 | |
| KR | 2014-0112339 A | 9/2014 | |
| KR | 20140112339 A * | 9/2014 | |
| WO | 2004010801 A2 | 2/2004 | |
| WO | 2004010801 A3 | 2/2004 | |
| WO | WO-2007063553 A1 * | 6/2007 | ............. A61K 9/286 |
| WO | 2009/053811 A2 | 4/2009 | |
| WO | 2010/006979 A1 | 1/2010 | |
| WO | 2014/134110 A1 | 9/2014 | |
| WO | 2014/161653 A1 | 10/2014 | |
| WO | 2014/191412 A1 | 12/2014 | |
| WO | 2014/207557 A2 | 12/2014 | |
| WO | 2015/059022 A1 | 4/2015 | |
| WO | 2015/082982 A1 | 6/2015 | |
| WO | 2015/177591 A2 | 11/2015 | |
| WO | 2018/042339 A1 | 3/2018 | |
| WO | 2019/064017 A1 | 4/2019 | |

OTHER PUBLICATIONS

Coffee Guide, Moisture content and drying [Online], published as early as Jun. 19, 2014, [retrieved on Oct. 8, 2021]. Retrieved from the Internet: <URL: https://web.archive.org/web/20140619104744/ https://www.thecoffeeguide.org/coffee-guide/coffee-quality/moisture-content-and-drying/ > (Year: 2014).*

Office action issued by Japanese Patent Office in JP counterpart application No. JP 2018-520649 A dated Sep. 10, 2020.

Melville L. Wolfrom et al. "Polysaccharides from instant coffee powder", Journal of agricultural and food chemistry, vol. 15, No. 4, Jul. 1, 1968, pp. 685-687.

Anonymous: "Zellstroff—Wikipedia", Nov. 17, 2017, found on the Internet: URL: https://de.wikipedia.org/w/index.php?title=Zellstroff &type=revision&diff=171314483&oldid=974523, p. 5, 3rd full paragraph of the machine English translation, which corresponds to p. 6, 2nd full paragraph of the original German version.

International Preliminary Report on Patentability Corresponding to PCT/EP2019/050827 dated Jul. 16, 2020.

International Search Report Corresponding to PCT/EP2019/050827 dated Apr. 8, 2019.

European Search Report Corresponding to 18151614 dated Jun. 29, 2018.

International Search Report Corresponding to PCT/EP2020/061094 dated Jul. 2, 2020.

Written Opinion Corresponding to PCT/EP2020/061094 dated Jul. 2, 2020.

E. M. Petrie, "Developments in Barrier Coatings for Paper and Board", Pira International Ltd, www.intertechpira.com, 2006.

N. C. Stinga, "Utilisation de la chimie chromatogénique pour la conception et la réalisation de matériaux cellulosiques barrières à l'eau, aux graisses et aux gaz", HAL open science, https://tel. archives-ouvertes.fr/tel-00452688, Feb. 2, 2010.

(56) References Cited

OTHER PUBLICATIONS

M. Schmid et al., "Water Repellance and Oxygen and Water Vapor Barrier of PVOH-Coated Substrates before and after Surface Esterification", polymers, 6, pp. 2764-2783, Nov. 3, 2014.

M. Hiorth et al., "Immersion coating of pellets with calcium pectinate and chitosan", International Journal of Pharmaceutics, 308, Dec. 1, 2005, pp. 25-32.

* cited by examiner

CAPSULE CONTAINING BEVERAGE POWDER, IN PARTICULAR FOR PREPARING BREWED COFFEE

CROSS-REFERENCE TO RELATED APPLICATIONS

This application is the U.S. national phase of international patent application no. PCT/EP2016/066197 filed on Jul. 7, 2016, which claims priority from European patent application no. 15175704.4 filed on Jul. 7, 2015.

BACKGROUND OF THE INVENTION

Field of the Invention

The present invention relates to a capsule containing a beverage powder, which is particularly suitable for the preparation of a beverage, such as cocoa, tea or coffee.

Description of the Related Art

Over the past few years, coffee capsules, besides coffee pads, have been used increasingly in the portion-wise preparation of beverages, in particular brewed coffee; the capsule walls are usually made of stainless steel, aluminium or plastic. Such capsules enable the storage of coffee powder for a fairly long period of time without loss of flavour. In addition, such capsules enable fast and user-friendly production of a portion of coffee with the desired flavour, in that a capsule containing the desired type of coffee is placed in a coffee machine adapted for this purpose, in which hot water is then pressed through the capsule, from which the desired brewed coffee is produced. However, such capsules are comparatively expensive because of the capsule material used and the production-intensive capsule construction. Furthermore, such capsules are environmentally problematic. The capsules are not recyclable, and the user usually disposes of them as residual waste. Recycling of coffee capsules therefore practically does not take place, which is particularly concerning in the case of aluminium-based coffee capsules, since the production of aluminium is very energy-intensive, resulting in such capsules having a particularly poor $CO_2$ balance. Another major disadvantage is that such capsules are not biodegradable and therefore cannot be disposed of biologically. Considering the fact that in Germany alone more than 2 billion coffee capsules are used annually, this is a very serious problem.

To at least partially overcome the above problems, capsules made of alternative materials have already been proposed.

For example, capsules are known from WO 2010/006979 A1 that are filled with coffee or tea in their interior and comprise a capsule wall, which in addition to the capsule contents also contains water as a structuring component. For the formation of a stable capsule wall, however, it is necessary that the capsule be cooled below the freezing point of the structuring component, because the structuring component melts when its freezing point is exceeded and moistens the capsule contents. Naturally, this restricts the use of such capsules considerably.

WO 2009/053811 A2 describes a capsule which can contain ground coffee, cappuccino powder, chocolate powder, milk powder or tea powder. The capsule consists of two half shells, which form the capsule walls. The capsule walls consist of a water-soluble material which dissolves during the brewing process. In this concept, the capsule wall material dissolves during the brewing process and thus becomes part of the prepared drink, which may undesirably affect the taste. Apart from that, the production of such capsules is complicated and expensive.

Taking this as the point of departure, the present invention is based on the objective of providing a capsule for the portion-by-portion preparation of beverages from beverage powder, such as cocoa, tea and coffee, which can not only be produced in a simple and cost-effective manner, but which, in particular, is also biodegradable and can therefore be disposed of in an environmentally friendly manner; the capsule can also be stored over a long period of time without any appreciable loss of flavour and can be used in correspondingly designed beverage vending machines.

BRIEF SUMMARY OF THE INVENTION

According to the invention, this objective is achieved by a capsule, wherein the capsule comprises a compacted pellet of a powder containing at least one polysaccharide, such as in particular coffee powder, wherein the compacted pellet is sheathed with at least one coating layer, with the at least one coating layer comprising a cross-linked polysaccharide, wherein the cross-linked polysaccharide has been or can be obtained by the cross-linking of a polysaccharide with a crosslinking agent without the use of a polyol separator or polyol spacer.

DETAILED DESCRIPTION OF THE INVENTION

This solution is based on the recognition that such a capsule consisting of a compacted pellet composed of a powder containing at least one polysaccharide, such as coffee powder, wherein the compacted pellet is sheathed by at least one coating layer composed of a cross-linked polysaccharide, not only exhibits all the necessary properties which are required for the use thereof in the portion-by-portion preparation of beverages, such as coffee, but in particular can also be disposed of in an environmentally friendly manner. In particular, the at least one coating layer composed of a cross-linked polysaccharide is stable enough to provide the capsule with sufficiently high transport protection, as well as handling protection. Apart from that, according to the invention, the capsule also protects the capsule content over a prolonged period of time without a noticeable loss of flavour. This is based on a synergistic cooperation of the at least one coating layer composed of crosslinked polysaccharide and the compacted pellet. The pressing of the coffee powder into a compacted pellet means that the surface area of the coffee powder which is accessible to oxygen is significantly reduced compared to powder in a not compacted form. In addition, the sheathing composed of a cross-linked polysaccharide functions as a further oxygen barrier. The combination of the reduced surface area and the sheathing thus results in preservation of the flavour of the capsule content. A further advantage of the capsule according to the invention consists in the fact that the at least one coating layer does not dissolve during the preparation of the beverage and consequently does not cause any adulteration of the taste of the prepared beverage. Aside from this, the capsule according to the invention can be produced in a simple and cost-effective manner. In addition, the capsule according to the invention can easily be produced in a spherical form and is thus excellently suited for use in a correspondingly adapted automatic beverage vending machine, because it can roll. Moreover, of particular importance is that the at least one cross-linked polysaccharide coating is completely biodegradable and can therefore be disposed of in an environmentally friendly manner. Because polysaccharides are not of fossil origin and their production is comparatively less energy intensive, the capsule according to the invention exhibits an advantageous $CO_2$ balance.

In principle, the present invention is not limited with regard to the chemical nature of the polysaccharide of the at least one coating layer. Good results are obtained when the polysaccharide of the at least one coating layer is selected from the group consisting of starch, cellulose, chitin, carrageenan, agar and alginates. Particularly preferred would be for the polysaccharide of the at least one coating layer to comprise a carrageenan or an alginate, whereby it is more particularly preferred that the polysaccharide of the at least one coating layer is an alginate. In the context of the present invention, it has been found that these polysaccharides do not cause any adulteration of the taste during the preparation of the beverage. In the context of the present invention, it has also been found that compacted pellets, in particular those composed of coffee powders, can easily be sheathed with alginate in a cost-effective manner. Alginates are biodegradable and provide a sufficiently stable sheathing and protection for the contents of the capsule without a significant loss of flavour. In the context of the present invention, it has also been found that alginates are able to reduce water hardness. An unpleasant acid taste is thereby lessened.

It is essential to the invention that the polysaccharide of the at least one coating layer is cross-linked. According to one embodiment of the present invention, the polysaccharide can be cross-linked via covalent bonds. Cross-linking via covalent bonds enables very durable sheathings. At the same time, cross-linking via covalent bonds usually takes place through the reaction of the polysaccharide with a suitable cross-linking agent. Particularly suitable cross-linking agents are difunctional organic compounds, wherein the functional groups are selected, for example, from the group that consists of carboxylic acids, salts of carboxylic acids, activated carboxylic acids, amines, alcohols, aldehydes and ketones. In this context, activated carboxylic acids are carboxylic acid halides, active esters of carboxylic acids, anhydrides of carboxylic acids or other reactive derivatives of carboxylic acids. Preferably, the cross-linking is carried out without the use of a spacer and, particularly, without a polyol spacer.

According to an alternative and particularly preferred embodiment of the present invention, the polysaccharide of the at least one coating layer is cross-linked via ionic and/or coordinative bonds. Such polysaccharides cross-linked via ionic and/or coordinative bonds can be produced in a particularly easy manner and do not impair the biodegradability of the polysaccharide used. The ionic and/or coordinative cross-linking can be achieved, for example, by means of polysaccharides which have anionic groups such as carboxylate groups or sulfonate groups. By introducing divalent or higher-valent cations, in particular alkaline earth metal ions, ionic or coordinative cross-linking of the anionic groups of the polysaccharide then takes place in order to form a stable sheathing layer.

In this context, a coordinative bond denotes an interaction between an electron pair donor and an electron pair acceptor, for example, such as can take place between free electron pairs of oxygen atoms in hydroxyl groups and cations.

More particularly preferred, in the case of the cross-linked polysaccharide, would be an alkaline earth metal alginate, and maximally preferred would be a calcium alginate. In this case, the calcium ions are the cross-linkers because they enter into coordinative or ionic bonds with groups of the alginate. In the context of the present invention, it has surprisingly been found that a sheathing comprising calcium alginate provides a water-insoluble layer which does not impair the taste of the beverage produced from the capsule and provides sufficient stability of the capsule in order to ensure protection during transport and handling without the capsule contents suffering a significant loss of flavour. Moreover, calcium alginate is excellently biodegradable. A further advantage is that calcium alginate is an approved food additive with the E-number E405 and is therefore harmless to health. It is additionally preferred in this embodiment that the content of the capsule, that is to say the compacted pellet composed of polysaccharide, is at least substantially free of alkaline earth metal ions and in particular calcium ions, by which is meant that the compacted pellet, except for the polysaccharide of which the compacted pellet is made and which might contain natural alkaline earth metal ions and in particular calcium ions, shall contain no further alkaline earth metal ions and in particular no calcium ions. It is particularly preferred that the compact pellet contained in the capsule or at least 80% of the internal volume of the compacted pellet should have an alkaline earth metal ion concentration and in particular a calcium ion concentration of less than 1 mol/l; less than 0.1 mol/l is preferred; even more preferred is less than 0.001 mol/l and particularly preferred is less than 0.001 mol/l; more particularly preferred would be less than 0.0001 mol/l and maximally preferred would be less than 0.00001 mol/l. "80% of the internal volume of the compacted pellet" is understood to mean the volume which is obtained when a spherical surface is spanned from the longest section leading radially from the centre point to the outer surface of the compacted pellet around the point lying at 80% starting from the centre point to the outer surface point. Contamination of the compacted pellet with alkaline earth metal ions and in particular calcium ions can be prevented in that the alkaline earth metal ions and in particular calcium alginate coating are produced in that the compacted pellet is first contacted with the alkali metal alginate solution and only thereafter, during the formation of the calcium alginate coating, with a liquid containing alkaline earth metal ions and especially calcium ions, and is not first contacted with a fluid containing an earth metal alginate and particularly calcium ions before an alkali metal alginate solution is added.

In principle, the capsule according to the invention can comprise only a coating layer of cross-linked polysaccharide. In order to increase the stability of the capsule and thus the transport safety and the handling protection, it is proposed in a further development of the inventive concept that the capsule according to the invention should comprise two or more coating layers. Preferably, the compacted pellet of the capsule is to be sheathed with 2 to 100 coating layers; particularly preferred would be 2 to 20 and more particularly preferred would be 2 to 10 and maximally preferred would be 2 to 5 coating layers. The sheathing of the compacted pellet of the capsule with two or more coating layers also increases the effect of the coating as an oxygen barrier as well as the resulting provision of effective aroma protection to a particularly high degree.

It has been found that the first coating layer penetrates as a gel into the still rough surface of the compacted pellet and leads to a smoother surface. This means a further surface area reduction, which enhances the flavour density further. An even smoother surface is then achieved with further coating layers, and this also exhibits the necessary stability, so that even harder shocks can be absorbed without a damaging effect.

According to a further, particularly preferred embodiment of the present invention, the coating of the capsule consists of 2 to 100 calcium alginate coating layers; preferred would be 2 to 20, particularly preferred would be 2 to 10 and highly preferred would be 2 to 5 layers with which the compacted pellet is to be sheathed.

The individual coating layers feature, depending on the viscosity of the sodium alginate and the procedure followed, thickness ranging between 50 and 600 µm. Particularly preferred would be layer thicknesses of up to 100 to 300 µm for the first coating layer, since they exhibit the optimum compromise between stability and drying speed. Subsequent coating layers are preferably thinner and are preferably between 50 and 200 microns thick to enable rapid drying.

A thin coating layer is preferred in order to remove the water contained in the gel more easily, and to facilitate the fastest possible diffusion of the cross-linking agent, that is the calcium ions, into the sodium alginate. In principle, the rate of diffusion of the calcium ions into the sodium alginate can also be increased with a higher concentration of the cross-linking agent; however, in the practical implementation of this variant, thin coating thicknesses have proven to be advantageous for the speed of the diffusion and handling.

The present invention is not particularly limited with regard to the material from which the compacted pellet of the capsule according to the invention is made. Good results are obtained when the compacted pellet contains or preferably is composed of or consists of a material which is selected from the group consisting of coffee, tea, drinking chocolate, cocoa and milk powder. Good results are obtained in particular when the compacted pellet consists of ground coffee powder.

In the context of the present invention, a compacted pellet is understood to mean compressed powder. Good results are obtained, in particular, if the compacted pellet of the capsule according to the invention is made by pressing powder, in particular coffee powder, with a pressure of 0.01 to 1000 MPa, preferably 0.05 to 500 MPa, particularly preferably 0.1 to 100 MPa, even more preferably 0.5 to 100 MPa, still more preferably 1 to 100 MPa, more particularly preferably 5 to 50 MPa, and most preferably 15 to 30 MPa. In this manner, sufficient compression can be provided for secure sheathing of the compacted pellet, and a good oxygen barrier can be achieved. At lower pressures, there is no sufficient cohesion and at higher pressures too strong cohesion occurs, which under some circumstances becomes relaxed after removal from the press, possibly leading to the destruction of the capsules.

The present invention further relates to a capsule which comprises a compacted pellet made from a powder of a substance selected from the group consisting of coffee, tea, drinking chocolate, cocoa and milk powder, wherein the compacted pellet is obtained by pressing the powder at a pressure of 0.01 to 1.000 MPa, preferably 0.05 to 500 MPa, particularly preferably 0.1 to 100 MPa, further preferably 0.5 to 100 MPa, still more preferably 1 to 100 MPa, more particularly preferably 5 to 50 MPa and most preferably 15 to 30 MPa, and wherein the compacted pellet is sheathed with 1 to 100, preferably with 2 to 20, particularly preferably with 2 to 10 and maximally preferably with 2 to 5 coating layers of calcium alginate. Maximally preferred is when the capsule, according to the invention, consists of a compacted pellet obtained from a powder of a substance selected from the group consisting of coffee, tea, drinking chocolate, cocoa and milk powder with a pressure of 15 to 30 MPa, and wherein the compacted pellet is sheathed with 2 to 20 coating layers of calcium alginate.

In principle, the compacted pellet can have any shape, for example, the shape of a truncated cone, cone, ellipsoid, cylinder, cuboid, a coffee bean or a sphere. The capsule according to the invention, particularly preferably has the shape of a sphere, since the ratio of surface to volume is lowest in this case, as a result of which the aroma is particularly well preserved. In addition, the spherical shape allows the capsule to roll and therefore to be used particularly well in a beverage vending machine.

The present invention further relates to a method for producing a capsule which comprises the following steps:
  i) preparing a compacted pellet from a powder containing at least one polysaccharide,
  ii) bringing at least part of the surface and preferably the entire surface of the compacted pellet used in step i) into contact with a solution of a polysaccharide in a solvent or with a dispersion of a polysaccharide in a dispersant,
  iii) when appropriate, removing of the compacted pellet from the solution or dispersion of step ii),
  iv) bringing the compacted pellet obtained in step ii) or iii) into contact with at least one cross-linking agent,
  v) when appropriate, removing the compacted pellet from the solution of step iv) and
  vi) drying of the compacted pellet obtained in step iv) or v).

The bringing into contact of the compacted pellet in step ii) is preferably carried out in such a way that at least a part of the surface and preferably the entire surface of the compacted pellet is wetted with the solution or dispersion of the polysaccharide. For example, the contacting of the compacted pellet in steps ii) and iv) is carried out independently of one another by immersion, spraying or coating of the compacted pellet with the solution or dispersion of the polysaccharide or with the cross-linking agents.

The method according to the invention makes it possible to sheath the compacted pellet evenly. Particularly even when the compacted pellet is spherical, without creating an edge or a seam.

The solvent or dispersant is preferably a water-based solvent or dispersant. Water is particularly preferred as the solvent or dispersant.

The compacted pellet in step ii) is preferably immersed in or sprayed with an aqueous 0.5 to 5 wt % alkali metal alginate solution. Particularly preferred is to immerse or spray the compacted pellet in step ii) with an aqueous 1 to 2 wt % alkali metal alginate solution. At a concentration of less than 0.5 wt %, the alkali metal alginate solution is not concentrated enough and is too low in viscosity to apply a sufficient amount of alkali metal alginate to the compacted pellet by simple dipping or spraying in order to produce a sufficiently stable sheathing in the following steps. If the concentration of the alkali metal alginate exceeds 5 wt %, the viscosity of the alkali metal alginate solution is so high that the formation of a full sheathing is impeded. In addition, the coating thicknesses increase at a concentration of the alkali metal alginate of over 5 wt %. so that drying becomes more difficult.

The alkali metal alginate solution is preferably a solution of a salt, which consists of alginate and a cation of an alkali metal or a related cation such as, for example, an ammonium ion. Particularly preferably, the alkali metal alginate solution is an aqueous solution of sodium alginate, potassium alginate or ammonium alginate. Sodium alginate, potassium alginate and ammonium alginate are approved food additives with E-numbers E401, E402 or E403. Such sheathings can be used without hesitation in the food industry. More particularly preferred is an aqueous solution of sodium alginate.

In the method of the present invention, it is preferred to immerse or to spray the compacted pellet in step iv) in/with an aqueous 1 to 15 wt %, preferably 1 to 7 wt %, alkaline earth metal salt solution. In the case of an alkaline earth metal salt concentration between 1 and 15 wt %, preferably between 1 and 7 wt %, rapid ionic cross-linking of the polysaccharide can be achieved. The alkaline earth metal salt is preferably a calcium salt, such as calcium chloride in particular.

Because the compacted pellet is first contacted with an alkali metal alginate solution and is only thereafter contacted with a liquid containing alkaline earth metal ions and, in particular, calcium ions, under formation of the coating containing alkaline earth metal ions and, in particular, a calcium alginate, it is achieved that the compacted pellet composed of polysaccharide in the capsule is at least substantially free of alkaline earth metal ions and in particular calcium ions. This is understood to mean that the compacted pellet contained in the capsule contains no further alkaline earth metal ions and in particular calcium ions apart from the naturally contained alkaline earth metal ions and in particular calcium ions possibly present in the polysaccharide from which the compacted pellet was made. It is particularly preferred that the compact pellet contained in the capsule or at least 80% of the internal volume of the compacted pellet should have an alkaline earth metal ion concentration and in particular a calcium ion concentration of less than 1 mol/l; less than 0.1 mol/l is preferred; even more preferred is less than 0.001 mol/l and particularly preferred is less than 0.001 mol/l; more particularly preferred would be less than 0.0001 mol/l and maximally preferred would be less than 0.00001 mol/l. "80% of the internal volume of the compacted pellet" is understood to mean the volume which is obtained when a spherical surface is spanned from the longest section leading radially from the centre point to the outer surface of the compacted pellet around the point lying at 80% starting from the centre point to the outer surface point.

In order to encapsulate a compacted pellet with several layers, steps ii) to v) or steps ii) to vi) can be repeated several times, namely preferably 2 to 20 times and particularly preferably 2 to 10 times and maximally preferably 2 to 5 times.

Drying in step vi) can be carried out in different ways, whereby various drying methods have proved to be successful. A very even drying can be achieved, although not exclusively, through drying in a stream of air in suitable channels, wherein the compacted pellet floats freely and dries evenly by its own rotation. To better absorb the water that diffuses out through the coating layer during its formation, contact drying on absorbent or warm surfaces has also proven to be useful. Both principles can be combined in a type of fluidized bed channel. Infrared dryers and microwave dryers can also be used as other very efficient drying principles.

The present invention further relates to the use of the capsule according to the invention for producing a beverage by bringing the capsule according to the invention into contact with water. Preferably, the capsule contains a material which is selected from the group consisting of coffee, tea, drinking chocolate, cocoa and milk powder.

The use of the capsule according to the invention for the preparation of a coffee beverage allows the portion-by-portion preparation of the beverage depending on the needs as required. A particular advantage of the application according to the invention is that only biodegradable waste is produced.

When using the capsule according to the invention for preparing a beverage, in particular a coffee beverage, the coffee capsules are preferably crushed or perforated before the extraction of the crushed or perforated coffee capsule with water takes place.

Hereinafter, the present invention will be explained on the basis of two examples which are meant to illustrate but are non-limiting.

Example 1

8 g of ground roasted coffee were pressed into a spherical compacted pellet with a press at a pressure of 20 MPa. The resulting spherical compacted pellet was then immersed in a 1 wt % aqueous sodium alginate solution and after 1 to 2 seconds, removed from the sodium alginate solution. After removal of the compacted pellet from the sodium alginate solution, it was sprayed with a 5 wt % $CaCl_2$) solution. Then, the compacted pellet was dried for 10 minutes at room temperature in a stream of air.

A capsule consisting of a compacted pellet with an encapsulated layer of calcium alginate was obtained.

Example 2

A coffee capsule was prepared as in Example 1, except that the steps of immersing the compacted pellet in the sodium alginate solution, removing from the sodium alginate solution, spraying with the calcium chloride solution and drying are to be repeated successively for a total of 5 times each.

A capsule consisting of a compacted pellet with five encapsulated layers of calcium alginate was obtained.

The invention claimed is:

1. A capsule for preparing a beverage from beverage powder by introducing water into the capsule, wherein the capsule comprises a compacted pellet made of a powder containing at least one polysaccharide, wherein the compacted pellet is sheathed with at least two coating layers, wherein at least one of the at least two coating layers comprises a cross-linked polysaccharide, wherein the cross-linked polysaccharide comprise an alkaline earth metal alginate, and wherein the cross-linked polysaccharide can be obtained by the cross-linking of a polysaccharide with a cross-linking agent without the use of a polyol spacer, by first contacting the compacted pellet with the polysaccharide and only thereafter with a liquid containing the cross-linking agent.

2. The capsule according to claim 1 wherein the cross-linked polysaccharide of the at least one of the at least two coating layers is calcium alginate.

3. The capsule according to claim 1 wherein at least 80% of an inner volume of the compacted pellet has a calcium ion concentration of less than 0.1 mol/liter.

4. The capsule according to claim 1 wherein at least 80% of an inner volume of the compacted pellet has a calcium ion concentration of less than 0.001 mol/liter.

5. The capsule according to claim 1 wherein the compacted pellet is at least substantially free of calcium ions other than the calcium ions naturally present in the polysaccharide of which the compacted polysaccharide is made.

6. The capsule according to claim 1 wherein the compacted pellet is sheathed with 2 to 100 coating layers of calcium alginate.

7. The capsule according to claim 1 wherein the compacted pellet includes a material selected from the group consisting of coffee, tea, drinking chocolate, cocoa and milk powder.

8. The capsule according to claim 1 wherein the compacted pellet can be obtained by pressing the powder with a pressure of 0.01 to 1000 MPa.

9. The capsule according to claim 1 wherein the capsule comprises a compacted pellet made from a powder of a substance selected from the group consisting of coffee, tea, drinking chocolate, cocoa and milk powder, wherein the compacted pellet is obtained by pressing the powder at a pressure of 0.01 to 1000 MPa, and wherein the compacted pellet is encapsulated with 1 to 100 coating layers of calcium alginate.

10. The capsule according to claim 1, wherein at least 80% of an inner volume of the compacted pellet has a calcium ion concentration of less than 1 mol/liter.

\* \* \* \* \*